United States Patent [19]
Duggan et al.

[11] Patent Number: 5,137,798
[45] Date of Patent: Aug. 11, 1992

[54] A PIT-FORMING OPTICAL RECORDING MEDIA AND PROCESS FOR PRODUCING THE SAME

[75] Inventors: Peter J. Duggan; Paul F. Gordon, both of Rochdale; Stephen J. Abbott, Altringham, all of England; Akihiko Kuroiwa, Yokohama, Japan; Toshiki Aoi; Tezumbumi Kamijo, both of Chiba, Japan

[73] Assignees: Imperial Chemical Industries PLC, London, United Kingdom; TDK Corporation, Tokyo, Japan

[21] Appl. No.: 548,189

[22] Filed: Jul. 5, 1990

Related U.S. Application Data

[63] Continuation of Ser. No. 333,825, Apr. 6, 1989, abandoned, which is a continuation of Ser. No. 214,812, Jun. 29, 1988, abandoned, which is a continuation of Ser. No. 810,178, Dec. 18, 1985, abandoned.

[30] Foreign Application Priority Data

Dec. 18, 1984 [GB] United Kingdom ............... 8431924

[51] Int. Cl.$^5$ .................... G03C 1/72; G03C 1/735
[52] U.S. Cl. .................... 430/270; 430/495; 430/945; 427/162
[58] Field of Search ............ 430/270, 495, 945, 19; 427/162

[56] References Cited

U.S. PATENT DOCUMENTS

| | | | |
|---|---|---|---|
| 2,290,906 | 7/1942 | Coffey et al. | 540/140 |
| 2,416,386 | 2/1947 | Haddock et al. | 540/122 |
| 2,456,274 | 12/1943 | Gutzwiller | 540/140 |
| 2,464,806 | 3/1949 | Haddock | 540/140 |
| 2,542,328 | 2/1951 | Haddock | 540/129 |
| 3,023,186 | 2/1962 | Geiger | 524/88 |
| 3,105,070 | 9/1963 | Bitterli | 540/125 |
| 3,981,734 | 9/1976 | Cabut | 106/20 |
| 4,002,642 | 1/1977 | Ische et al. | 540/137 |
| 4,298,975 | 11/1981 | van der Veen et al. | 430/495 |
| 4,458,004 | 7/1984 | Tanikawa | 430/270 |
| 4,529,688 | 7/1985 | Law et al. | 430/945 |
| 4,606,859 | 8/1986 | Duggan et al. | 540/122 |

FOREIGN PATENT DOCUMENTS

| | | |
|---|---|---|
| 1030959 | 4/1978 | Canada. |
| 0155780 | 9/1985 | European Pat. Off.. |
| 01533729 | 9/1985 | European Pat. Off.. |
| 1469766 | 9/1969 | Fed. Rep. of Germany. |
| 2455675 | 6/1975 | Fed. Rep. of Germany. |
| 2531823 | 1/1976 | Fed. Rep. of Germany. |
| 2439600 | 3/1976 | Fed. Rep. of Germany. |
| 2637861 | 4/1977 | Fed. Rep. of Germany. |
| 492177 | 9/1938 | United Kingdom. |
| 589118 | 3/1947 | United Kingdom. |
| 1164234 | 1/1969 | United Kingdom. |
| 1496256 | 5/1977 | United Kingdom. |
| 2066489 | 7/1981 | United Kingdom. |

OTHER PUBLICATIONS

"Phtalocyanine Compounds" Frank H. Mosey and Arthur L. Thomas, edited in New York by Reinhold, 1963 pp. 371 and 321.
Lever, Advances in Inorganic Chemistry, vol. 7, pp. 27-33 (1965).

Primary Examiner—Charles L. Bowers, Jr.
Assistant Examiner—Lee C. Wright
Attorney, Agent, or Firm—Cushman, Darby & Cushman

[57] ABSTRACT

A pit-forming optical recording medium comprises a substrate supporting a film of optically deformable recording material comprising an organic dye for absorbing optical signals of modulated electromagnetic radiation applied to the film and thereby causing corresponding deformations of the film when the signal intensities exceed predetermined threshold levels. The dye is a phthalocyanine compound or mixture of phtalocyanine compounds in which each of at least five of the peripheral carbon atoms in the 1, 4, 5, 8,9, 12, 13 or 16 positions (the "3,6-positions") of the phthalocyanine nucleus, as shown in Formula I, is linked by an atom from Group VB or Group VIB of the Periodic Table to a carbon atom of an organic radical. In preferred compounds each of the eight 3,6-positions is linked by an atom from Group VB or Group VIB, especially sulphur, selenium or nitrogen, to an organic radical.

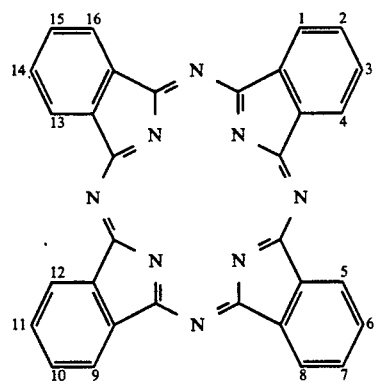

30 Claims, No Drawings

A PIT-FORMING OPTICAL RECORDING MEDIA AND PROCESS FOR PRODUCING THE SAME

This is a continuation of application Ser. No. 07/333,825, filed on Apr. 6, 1989, which was abandoned upon the filing hereof, which is a continuation of application Ser. No. 07/214,812, filed Jun. 29, 1988, which is a continuation of application Ser. No. 06/810,178, filed Dec. 18, 1985 both now abandoned.

The invention relates to an optical recording medium suitable for recording information as a sequence of bits applied to successive selected portions of the medium in the form of a modulated light signal, e.g. from a laser. In particular the invention relates to the kind of medium generally referred to as a "pit-forming" optical recording medium designed to absorb light focussed onto the selected portions in turn and, when the light intensity exceeds a predetermined threshold level, to cause a mass flow of material and loss of material from those portions, resulting in pits, holes or other mass-flow deformations corresponding to the modulations of the of the absorbed light (the term "pit-forming" covering all such deformations herein). The invention relates especially, but not exclusively, to erasable recording media.

Various forms of pit-forming optical recording media are known or have been described in the literature. Typically they are used in the form of a spinning disk or moving card, and comprise a substrate supporting a film of optically deformable recording medium, either directly in contact with each other or separated by other layers such as, for example, metallic reflective layers and transparent spacing layers for deriving optical interference effects. Modulated light, usually from a laser, is focussed onto the successive portions of the film as the medium moves, to produce the pits and other deformations, thereby writing into the film a record of the modulations. the signal intensity requirements for any particular film are predetermined by the nature of the film composition, but typical known films can be written on by 2–40 mW lasers. The signals written into such films in this manner can be read later, e.g. by using a laser of lower power than that required for writing, together with an appropriate detector to sense a difference in reflected or transmitted light intensity.

In order to achieve deformations in this way it is necessary first to absorb the modulated light energy carrying the information, and as active ingredient various organic dyes have previously been suggested, used either as pure materials forming the whole deformable film, or as mixtures (preferably solutions) with polymer binders or other additives. However these have generally not been entirely satisfactory in one or more ways. For example a common problem is that otherwise suitable dyes have melting points which are too high to be deformed by reasonably low powered lasers if used alone, and to overcome this it has been suggested that the film be made up using a binder of a lower melting wax. Likewise the dye can be used with a miscible low-melting polymer binder to reduce its melting point. Unfortunately, any significant quantities of such additional materials dilute the dye as active ingredient, with consequential loss of sensitivity. High resolution can also be lost by any phase separation of such mixtures, or by the crystal size of any crystalline dye. Some other dyes are insoluble in common solvents, and require the use of more difficult techniques such as evaporative coating. Poor thermal stability of some dyes lead to noticeable degradation after repeated reading or prolonged storage. Indeed we have found that previously known materials are not generally suitable for use in erasable recording material, some due to their high melting points and/or thermal degradation on repeated write/erase cycles. Others, especially dye/binder compositions, tend not to return to a smooth even film when attempts are made to erase the deformations by heat or laser. However, we have now developed a family of phthalocyanine dyes absorbing in the near infra-red region of the electro-magnetic spectrum, i.e. from 700 to 1500 nm, which can impart to a pit-forming optical recording medium employing them as light-absorbing material, a particularly good balance of characteristics, some for write-once media and others for erasable recording media.

Accordingly, we now provide a pit-forming optical recording medium comprising a substrate supporting a film of optically deformable recording material comprising an organic dye for absorbing optical signals of modulated electromagnetic radiation applied to the film and thereby causing corresponding deformations of the film when the signal intensities exceed predetermined threshold levels, characterised in that the dye is a phthalocyanine compound or mixture of phthalocyanine compounds in which each of at least five of the peripheral carbon atoms in the 1, 4, 5, 8, 9, 12, 13, or 16 positions of the phthalocyanine nucleus, as shown in Formula I is linked by an atom from Group VA or Group VIA of the Periodic Table to a carbon atom of an organic radical.

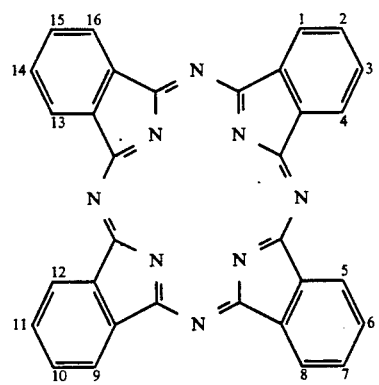

The carbon atoms in the 1, 4, 5, 8, 9, 12, 13, and 16 positions are hereinafter referred to as the "3,6-carbon atoms" by relation to the equivalent 3,6-positions in the four molecules of phthalic anhydride, see Formula II, from which the phthalocyanine can be derived.

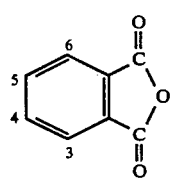

The remaining peripheral atoms of the phthalocyanine nucleus may be unsubstituted, i.e. carry hydrogen atoms, or be substituted by other groups, for example, halogen atoms or amino groups, or they may also be linked by an atom from Group VA or Group VIA of the Periodic Table to a carbon atom of an organic radical. It is preferred that each of at least six, and more preferably at least eight, of the 3,6 carbon atoms is linked by a Group VA or Group VIA atom to an organic radical.

In a first preferred class of phthalocyanine compound according to the present invention each of eight of the peripheral carbon atoms, at least five, preferably at least six and more preferably all, of which are 3,6 carbon atoms, is linked by an atom from Group VA or Group VIA to an organic radical. It is further preferred that each 3,6 carbon atom is linked to a separate organic radical. The remaining peripheral carbon atoms may carry other substituents, e.g. halogen atoms, but are preferably unsubstituted.

In a second preferred class each of from nine to sixteen of the peripheral carbon atoms, at least five, preferably at least six and more preferably eight, of which are 3,6 carbon atoms, is linked by an atom from Group VA or Group VIA to an organic radical. The remaining peripheral carbon atoms are preferably unsubstituted or carry halogen atoms. In the second class preferably each of at least ten, and more preferably at least twelve, of the peripheral carbon atoms is linked by a group VA or Group VIA atom to an organic radical. Especially valuable compounds of this second class are those in which each of fifteen or sixteen of the peripheral carbon atoms is linked to an organic radical by an atom from Group VA or Group VIA.

Compounds of especial interest have an absorption peak above 750 nm, especially in the region from 750 to 1100 nm, and those of more especial interest have 90% of their absorption strength at or above 750 nm.

The organic radical may be an optionally substituted aliphatic, alicyclic or aromatic radical and is preferably an optionally substituted aromatic radical, especially from the benzene, naphthalene and mono- or bi-cyclic, heteroaromatic series. Examples of suitable aromatic radicals are optionally substituted phenyl, phenylene, naphthyl, especially naphth-2-yl, naphthylene, pyridyl, thiophenyl, furyl, pyrimidyl and benzthiazolyl. Aliphatic radicals are preferably from the alkyl and alkenyl series containing up to 20 carbon atoms, such as vinyl, allyl, butyl, nonyl, dodecyl, octadecyl and octadecenyl. Alicyclic radicals are preferably homocyclic containing from 4 to 8 carbon atoms, such as cyclohexyl. The organic radical may be monovalent and attached to a single peripheral carbon atom through a single Group VA or Group VIA atom or it may be polyvalent, preferably divalent, and attached to adjacent peripheral carbon atoms through identical or different atoms from Group VA and Group VIA. Where the organic radical is polyvalent it may be attached to two or more phthalocyanine nuclei.

Examples of substituents for the aromatic and heteroaromatic radicals are alkyl, alkenyl, alkoxy and alkylthio, and halo substituted derivatives thereof, especially those containing up to 20 carbon atoms, aryl, arylthio, especially phenyl and phenylthio, halogen, nitro, cyano, carboxyl, aralkyl, aryl- or alkyl-sulphonamido, aryl- or alkyl- sulphone, aryl or alkyl-sulphoxide, hydroxy and primary, secondary or tertiary amino. Examples of substituents for the aliphatic and cycloaliphatic radicals are alkoxy, alkylthio, halo, cyano and aryl. In these substituents the alkyl and alkenyl groups preferably contain up to 20, and more preferably up to 4, carbon atoms and the aryl groups are preferably mono- or bi-homo- or hetero-cyclic. Specific examples of substituents are methyl, ethyl, dodecyl, methoxy, ethoxy, methylthio, allyl, trifluoromethyl, bromine, chlorine, fluorine, benzyl, COOH, —COOCH$_3$, —COOCH$_2$C$_6$H$_5$, —NHSO$_2$CH$_3$, —SO$_2$C$_6$H$_5$, NH$_2$, —NHC$_2$H$_5$, and N(CH$_3$)$_2$.

Examples of suitable atoms from Group VA and Group VIA for linking the organic radical to a peripheral carbon atom of the phthalocyanine nucleus are sulphur, selenium, tellurium and nitrogen or any combination of these. Where an organic radical is linked to adjacent peripheral carbon atoms, the second bridging atom may be any atoms from Group VA or Group VIA and examples are sulphur, oxygen, selenium, tellurium and nitrogen. Where the linking atom is nitrogen the free valency may be substituted or unsubstituted, e.g. it may carry an alkyl group, preferably C$_{1-4}$-alkyl or an aryl group, preferably phenyl.

The phthalocyanine nucleus may be metal free, i.e. it may carry two hydrogen atoms at the centre of the nucleus, or it may be complexed with a metal or oxymetal derivative, i.e. it may carry one or two metal atoms or oxy-metal groups complexed within the centre of the nucleus. Examples of suitable metals and oxymetals are copper, lead, cobalt, nickel, iron, zinc, germanium, indium, magnesium, calcium, palladium, gallanyl and vanadyl.

Suitable compounds according to the first preferred class are those conforming to the following formula:

$$\text{octa-3,6—(RX)—Pc—M}_k \qquad \text{III}$$

wherein

M is a metal atom or hydrogen;

k is the inverse of half the valency of M;

Pc is the phthalalocyanine nucleus;

X is sulphur, selenium, tellurium or NT where T is H, alkyl or aryl; and

R is a monovalent aromatic radical, preferably optionally substituted benzene or naphthalene;

or R and T together form an aliphatic or aromatic ring.

Throughout this specification the symbols, H$_2$Pc and MPc, in which M is a metal, e.g. Cu, Zn or Pb, will be used to indicate unmetallised and metallised phthalocyanines respectively.

Examples of compounds of the first preferred class and mostly conforming to Formula III are:

octa-3,6-(4-methylphenylthio)-CuPc
octa-3,6-(benzylthio)-CaPc
octa-3,6-(naphth-2-ylthio)-CuPc
octa-3,6-(4-methoxyphenylthio)-GePc
octa-3,6-(4-butoxyphenylthio)-CoPc
octa-3,6-(phenyltelluro)-H$_2$Pc
octa-3,6-(ethylthio)-NiPc
octa-3,6-(4-t-butylphenylthio)-(VO)Pc
octa-3,6-(hexadecylthio)-CuPc
octa-3,6-(4-methylthiophenylthio)-CuPc
octa-3,6-(4-dodecyloxyphenylthio)-CuPc
hepta-3,6-(n-octylthio)-mono-3,6-chloro-CuPc
octa-3,6-(3,4-dimethylphenylthio)-H$_2$Pc
octa-3,6-(pyrid-2-ylthio)-H$_2$Pc
octa-3,6-(2,4-dimethoxyphenylthio)-CuPc
phen-1,4-ylenedithio-bis[hepta-3-6-(4-thiophenylthio]-CuPc
hepta-3,6-(4-butylphenylthio)-mono-3,6-chloro-H$_2$Pc
octapiperidino-octachloro-H$_2$Pc
octa(diethylamino)-H$_2$Pc
octa(ethylamino)-H$_2$Pc Suitable compounds from the second preferred class are those conforming to the following formulae:

$$M_kPc(XR)_n(Y)_m \qquad \text{IV}$$

and $$M_kPc(X^1-Q-X)_p(XR)_q(Y)_m \qquad \text{V}$$

wherein
M is a metal atom or hydrogen;
k is the inverse of half the valency of M;
Pc is the phthalocyanine nucleus;
X is sulphur, selenium, tellerium or NT where T is H, alkyl or aryl;
R is a monovalent aromatic radical; or R and T together form an aliphatic or aromatic ring;
n is an integer from 10 to 16;
Y is a halogen atom;
m is an integer from 0 to 6;
$X^1$ is sulphur, selenium, tellurium, oxygen or NT in which T is H, alkyl or aryl;
Q is a divalent aromatic radical;
p is an integer from 1 to 8;
q is an integer from 0 to 14;
provided that
(a) at least 6 of the groups represented by Q and R are attached through linking groups X to octa-3,6 carbon atoms,
and (b) n or the sum of 2p and q is from 10 to 16, preferably from 12 to 16 and more preferably 15 or 16.

Examples of compounds conforming to Formulae IV and V are:
deca(4-methylphenylthio)-pentachloro-CuPc
deca(4-t-butylphenylthio)-pentachloro-CuPc
deca(naphth-2-ylthio)-hexachloro-CuPc
deca(4-ethylthiophenylthio)-pentachloro-CuPc
unadeca(4-methylphenylthio)-bromo-CuPc
unadeca(4-dimethylaminophenylthio)-pentachloro-CuPc
dodeca(4-methylphenylthio)-CuPc
dodeca(4-t-butylphenylthio)-trichloro-CuPc
terdeca(4-butoxyphenylthio)-dichloro-InPc
pentadeca(n-butylthio)-CuPc
pentadeca(4-carboxylphenylthio)-CuPc
pentadeca(4-t-butylphenylthio)-CuPc
pentadeca(phenylseleno)CuPc
pentadeca(naphth-2-ylthio)-MgPc
pentadeca(naphth-1-ylthio)-CuPc
pentadeca(4-methoxyphenylthio)CuPc
pentadeca(4-dodecyloxyphenylthio)-CuPc
pentadeca(4-methylthiophenylthio)-CuPc
pentadeca(phenylthio)-CuPc
pentadeca(4-butoxyphenylthio)-CuPc
pentadeca(n-dodecylthio)-CuPc
pentadeca(benzimidazol-2-ylthio)-CuPc
hexadeca(4-methylphenylthio)-CuPc
hexadeca(4-methylphenylthio)-ZnPc
hexadeca-anilino-$H_2$Pc
hexadeca(4-methylphenylthio)-PbPc
hexadeca(4-methylphenylthio)-$H_2$Pc
hexadeca(4-chlorophenylthio)-NiPc
hexadeca(piperidino)-$H_2$Pc
hepta(4-methylphen-1,2-ylenedithio)-di(4-methyl-2-thiolphenylthio)-CuPc
hepta(4-methylphen-1,2-ylenedithio)-di(4-methyl-2-thiolphenylthio)$H_2$Pc
octa(phen-1,2-ylenediamino)$H_2$Pc
hexadeca(diethylamino)$H_2$Pc
hexadeca(ethylamino)$H_2$Pc Preferred values for, and examples of, the groups represented by R, Q and T are as given hereinbefore in respect of the organic radical. Where R and T together form an aliphatic or aromatic ring this may be, for example, pyrid-1-yl, pyrimid-1-yl, piperidin-1-yl, morpholin-1-yl, pyrrol-1-yl or pyrrolidin-1-yl.

The phthalocyanine compounds of the present invention can be prepared by heating a phthalocyanine compound carrying halogen atoms attached to the peripheral carbon atoms to which it is wished attach the Group VA or Group VIA atoms with at least six equivalents of an organic thiol, or an equivalent compound in which the sulphur in the thiol group is replaced by selenium (selenol), tellurium (tellurol) or NT (amine), in an organic solvent.

The compounds of the first preferred class in which X is sulphur can be prepared by heating an octa-halophthalocyanine, in which at least six, and more preferably all, of the halogen atoms are attached to 3,6 carbon atoms, with at least eight equivalents of an organic thiol in an organic solvent.

The compounds of the second preferred class in which X is sulphur can be prepared by heating a phthalocyanine carrying at least nine halogen atoms, at least six of which are attached to 3,6 carbon atoms, with at least nine equivalents of an organic thiol in an organic solvent. If the organic thiol also carries another substituent, such as a second thiol group or a hydroxy or a primary or secondary amino group, which will react with a halogen atom attached to an adjacent peripheral carbon atom on the phthalocyanine nucleus, the organic radical of the thiol may become linked to two adjacent peripheral carbon atoms.

Other compounds of the preferred classes may be prepared by using, in place of the thiol, an equivalent compound in which the sulphur is replaced by selenium, tellurium or a group, NT.

The organic solvent, which need not necessarily be a liquid at ambient temperatures and may only partially dissolve the reactants, preferably has a boiling point from 100° C. to 300° C. and more preferably from 150° C. to 250° C. The organic solvent is preferably essentially inert although it may catalyse the reaction. Examples of suitable solvents are methylcyclohexanol, octanol, ethylene glycol, and especially benzyl alcohol and quinoline.

Reaction is conveniently carried out under reflux, preferably from 100° C. to 250° C. and more preferably above 150° C., in the presence of an acid binding agent, such as potassium or sodium hydroxide or sodium carbonate, to neutralise the halo acid formed. The product may be isolated by filtration or by distillation of the organic liquid. The isolated product is preferably purified by repeated recrystallisation from a suitable solvent, such as ethanol, chloroform or pyridine, and/or chromatography, using a silica-filled column and an aromatic solvent, such as toluene or xylene, as eluent.

Examples of these dyes and their preparations have been described in European Patent Specification No 155780 A2, published Sep. 25, 1985.

The present dyes are highly compatible with a wide range of polymers, and can thus be used to form polymer/dye composite films, without fear of such adverse effects as phase separation leading to undesirable grain formation in the active recording material. Particularly suitable polymers are amorphous polymers such as polyamide polystyrene or polycarbonate. However, the dyes themselves are low to medium melting point solids which are structurally stable below their melting points. The lower melting point dyes in particular can be used without any associated polymer melting point depressant, to provide an active layer on which information can readily be written and erased using low powered lasers (e.g. 20 mW or less), their high structural stability keeping any loss of recorded signal during storage or reading, to a minimum. For reasons discussed in the preamble hereinabove we prefer to take advantage of these properties and to use a recording film consisting essentially of the dye alone or with just a minor proportion of additives, e.g. up to 30% by weight of such additives as melt flow modifiers and/or surfactants to assist manufacture, typical levels of surfactant, for example, generally being less than 3%.

By selecting appropriate substituents, the amorphous melting points of these dye molecules can be tailored to a range appropriate for each envisaged purpose. Thus for most purposes where the information is to be stored at ambient temperature and read repeatedly, we prefer to use dyes having melting points above 100° C. For ease of erasure we prefer to use dyes whose melting points are less than 150° C., those around 120° C. being particularly useful. With such dyes we have effectively used lasers at 10 mW power to provide high resolution recordings which proved to be stable when stored at ambient temperatures and when read repeatedly using a 1 mW beam without detecting any significant loss of recorded signal. For write once applications, where erasure is not required but where a high quality of recording is to be maintained for substantial periods under normal user conditions, we prefer to use dyes having melting points greater than 150° C., preferably greater than 180° C. The dyes are all compatible, and combinations of the dyes can also be used to tailor the active films to specific requirements.

The present dyes exhibit high reflectivity of light, typically greater than 20%, at and around the wavelengths used for writing, i.e. at about which there is high absorption. Such high reflectivity is highly desirable both for reading recorded information, and for systems requirements such as focussing and tracking of the laser beam. No additional reflective layer need then be used, at least when using a reading beam having a similar wavelength to that used for writing. We prefer to use the same wavelength for both reading and writing modes so that the same laser can be used and thereby avoid any misalignment occurring when changing modes. Absence of any additional reflector also enables the medium to be written and read by transmission through the substrate, so that any dust accumulated on the surface will be out of the plane of focus of the laser. However, should the user prefer a configuration employing a relective laser for any specific purpose or apparatus, the good molecular and structural stability of the present dyes can be taken advantage of in such configurations also.

Being soluble in common organic solvents, such as toluene, thin films of the present dyes can readily be formed on supporting substrates by any of the known solution casting techniques, such as spin coating, dip coating and web coating. Coating substrates from solutions is generally a much easier process to carry out than the previous vacuum deposition techniques required for some other active materials such as vanadyl phthalocyanine, and enables soluble additives to be included in the casting composition so as to be cast at the same time, thereby giving a uniform film. In particular films of the pure dyes cast in this manner can be smooth, homogeneous, and (when desired) free from crystallinity. They are thus highly suitable for high resolution data storage. However, although vacuum deposition is not our presently preferred process for making the present media, the present phthalocyanine dyes are still capable of being deposited by such techniques should they ever become commercially advantageous or otherwise desirable.

Films of the present dyes also have high extinction coefficients, giving efficient absorption of the light. In addition they convert the absorbed light efficiently into heat, with little fluorescence, this combination giving particularly efficient data writing.

Recorded information can be erased from the entire medium by heating it on a hotplate or in an oven to temperatures greater than the melting point of the recording material. However, when using a lower melting point dye alone or with only minor amounts of additives, a single track or sector can be erased from a spinning disc by warming gently with an unfocussed laser beam so that the dye flows back into the pits. Such treatment of pure dye films we find reforms the original smooth film surface more readily than polymer/dye composition or other mixtures of compounds having different melting points and viscosities. As an alternative to the unfocussed beam, a focussed but weaker beam can also be effective.

The invention is illustrated by the following specific example.

Pentadeca (2-naphthyl thio) copper phthalocyanine was dissolved in toluene (weight ratio of dye: solvent being 1:54) and this was spin coated at 1000 rpm onto a transparent substrate comprising an acrylic polymer disk 30 cm in diameter and 1.3 mm thick. The thickness of the applied coating of dye was measured as 0.08 um, after drying (medium 1).

The medium was rotated at 600 rpm. Pits were written into the dye film using laser diode light at 830 nm, a numerical aperture of 0.6 giving actual power focussed on the medium of 9 mW, the light being modulated with a constant tone ("carrier") signal. The pits were then read using laser light at the same wavelength but with power reduced to 1 mW, and the carrier to noise ratio (C/N) determined in the normal manner.

Reading was continued for a further hour to test the stability of the recording to the reading energy, and the C/N ratio again determined. To test the thermal stability of the recorded medium, it was then kept at 50° C. for a further 24 hours while exposed to ambient room lighting, and the C/N ratio again measured.

For comparison with known dyes, a second medium was prepared as above but the phthalocyanine dye was replaced by a known cyanine dye, 1, 1', 3, 3, 3', 3', Hexamethyl-4, 4', 5, 5'-dibenzo-2, 2',-indotricalobyanine Perchlorate (HDITC), previously proposed for use in pit-forming optical recording. It was tested in like manner, and the results of the two sets of measurements were as follows:

| | C/N (dB) | | |
|---|---|---|---|
| medium | immediate | after 1 hour of reading | after 50° C. thermal test |
| 1 | 55 | 55 | 55 |

| | C/N (dB) | | |
|---|---|---|---|
| medium | immediate | after 1 hour of reading | after 50° C. thermal test |
| 2 | 39 | 28 | 22 |

The above results show the high readout performance of the present dyes, and their relatively high stability under conditions of continuous use and storage to which such media may be expected to be exposed during normal usage, compared with previously known dyes under the same conditions.

We claim:

1. A pit-forming optical recording medium comprising a substrate supporting a film of optically deformable recording material comprising an organic dye for absorbing optical signals of modulated electromagnetic radiation applied to the film and thereby causing corresponding deformations of the film when the signal intensities exceed predetermined threshold levels, wherein the dye is a phthalocyanine compound or mixture of phthalocyanine compounds in which each of at least five of the peripheral carbon atoms in the 1, 4, 5, 8, 9, 12, 13, or 16 positions of the phthalocyanine nucleus, as shown in Formula I is linked by an atom from Group VA or Group VIA of the Periodic Table to a carbon atom of an organic radical and wherein the film is formed by a solution coating technique:

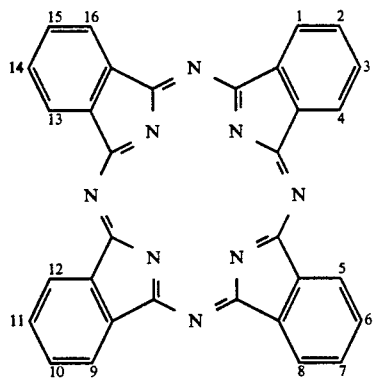

I

2. An optical recording medium according to claim 1 wherein each of the eight peripheral carbon atoms in the 1,4,5,8,9,12,13 and 16 positions of the phthalocyanine nucleus is linked by an atom from Group VA or Group VIA of the Periodic Table to a carbon atom of an organic radical.

3. An optical recording medium according to claim 2 wherein the 2, 3, 6, 7, 10, 11, 14 and 15 position carbon atoms of the phthalocyanine nucleus are unsubstituted.

4. An optical recording medium according to claim 1 wherein each of from one to eight of the 2, 3, 6, 7, 10, 11, 14 and 15 positions carbon atoms of the phthalocyanine nucleus is linked by an atom from Group VA or Group VIA of the Periodic Table to a carbon atom of an organic radical.

5. An optical recording medium according to claim 1 wherein each of fifteen or sixteen of the peripheral carbon atoms of the phthalocyanine nucleus is linked by an atom from Group VA or Group VIA of the Periodic Table to a carbon atom of an organic radical.

6. An optical recording medium according to claim 2 wherein the phthalocyanine compound has an absorption maximum above 750 nm.

7. An optical recording medium according to claim 1 wherein the organic radical is an optionally substituted aliphatic, cycloaliphatic or aromatic radical.

8. An optical recording medium according to claim 7 wherein the organic radical is an optionally substituted phenyl, naphthyl or mono- or bi-cyclic heteroaromatic radical.

9. An optical recording medium according to claim 1 wherein the organic radical is bivalent and attached to adjacent peripheral carbon atoms on the phthalocyanine nucleus through atoms from Group VA or Group VIA of the Periodic Table.

10. An optical recording medium according to claim 2 wherein the atom from Group VA or Group VIA of the Periodic Table is sulphur, selenium, tellurium or nitrogen.

11. An optical recording medium according to claim 4 wherein at least one of the peripheral carbon atoms of the phthalocyanine nucleus is linked to an organic radical through an oxygen atom.

12. An optical recording medium according to claim 1 wherein the recording film consists essentially of from 70 to 100% by weight of the dye.

13. An optical recording medium according to claim 1 wherein the amorphous melting point of the dye is less than 150° C.

14. A process of producing a pit-forming optical recording medium including a substrate supporting a film of optically deformable recording material including an organic dye, said dye being a phthalocyanine compound or mixture of phthalocyanine compounds in which each of at least five of the peripheral carbon atoms in the 1, 4, 5, 8, 9, 12, 13, or 16 positions of the phthalocyanine nucleus, as shown in Formula I is linked by an atom from Group VA or Group VIA of the Periodic Table to a carbon atom of an organic radical,

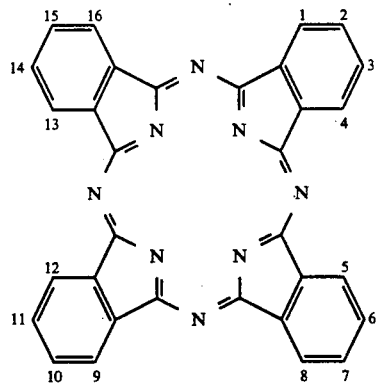

I comprising the steps of:
dissolving said phthalocyanine compound or mixtures of phthalocyanine compounds in an organic solvent, resulting in a phthalocyanine solution; and
coating said phthalocyanine solution on to said substrate to produce said recording medium.

15. The process of claim 14, wherein said organic solvent is selected from the group consisting of ethanol, chloroform, pyridine, toluene and xylene.

16. A process as claimed in claim 14 in which said phthalocyanine compound or said mixture of phthalocyanine compounds is dissolved in said organic solvent together with an additive or additives selected from melt flow modifiers and surfactants, and in which the resulting solution is coated on to said substrate.

17. A process as claimed in claim 16 in which said additive comprises a polymer.

18. A process as claimed in claim 16 in which said additive or additives are present in a proportion of up to 30% by weight relative to the phthalocyanine compound or compounds.

19. A process as claimed in claim 14, wherein each of the eight peripheral carbon atoms in the 1, 4, 5, 8, 9, 12, 13 and 16 positions of the phthalocyanine nucleus is linked by an atom from Group VA or Group VIA of the Periodic Table to a carbon atom of an organic radical.

20. A process as claimed in claim 19, wherein the 2, 3, 6, 7, 10, 11, 14 and 15 position carbon atoms of the phthalocyanine nucleus are unsubstituted.

21. A process as claimed in claim 14, wherein each of from one to eight of the 2, 3, 6, 7, 10, 11, 14 and 15 position carbon atoms of the phthalocyanine nucleus is linked by an atom from Group VA or Group VIA of the Periodic Table to a carbon atom of an organic radical.

22. A process as claimed in claim 14, wherein each of fifteen or sixteen of the peripheral carbon atoms of the phthalocyanine nucleus is linked by an atom from Group VA or Group VIA of the Periodic Table to a carbon atom of an organic radical.

23. A process as claimed in claim 14, wherein the phthalocyanine compound has an absorption maximum above 750 nm.

24. A process as claimed in claim 14, wherein the organic radical is an optionally substituted aliphatic, cycloaliphatic or aromatic radical.

25. A process as claimed in claim 24, wherein the organic radical is an optionally substituted phenyl, naphthyl or mono- or bi-cyclic heteroaromatic radical.

26. A process as claimed in claim 14, wherein the organic radical is bivalent and attached to adjacent peripheral carbon atoms on the phthalocyanine nucleus through atoms from Group VA or Group VIA of the Periodic Table.

27. A process as claimed in claim 14, wherein the atom from Group VA or Group VIA of the Periodic Table is sulphur, selenium, tellurium or nitrogen.

28. A process as claimed in claim 14, wherein at least one of the peripheral carbon atoms of the phthalocyanine nucleus is linked to an organic radical through an oxygen atom.

29. A process as claimed in claim 14, wherein the recording film consists essentially of from 70 to 100% by weight of the dye.

30. A process as claimed in claim 14, wherein the amorphous melting point of the dye is less than 150° C.

* * * * *